(12) United States Patent
Javadekar et al.

(10) Patent No.: US 10,713,121 B1
(45) Date of Patent: Jul. 14, 2020

(54) DYNAMIC MIGRATION OF A CLOUD BASED DISTRIBUTED FILE SYSTEM METADATA SERVER

(71) Applicant: EMC IP Holding Company LLC, Hopkinton, MA (US)

(72) Inventors: Shrinand Javadekar, Sunnyvale, CA (US); Deepak Bobbarjung, Sunnyvale, CA (US); Christopher W. Frederick, Sioux Falls, SD (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 515 days.

(21) Appl. No.: 15/581,027

(22) Filed: Apr. 28, 2017

(51) Int. Cl.
| | | |
|---|---|---|
| G06F 16/182 | (2019.01) | |
| G06F 11/14 | (2006.01) | |
| H04L 29/08 | (2006.01) | |
| G06F 16/172 | (2019.01) | |
| G06F 16/185 | (2019.01) | |
| G06F 16/215 | (2019.01) | |
| G06F 16/176 | (2019.01) | |

(52) U.S. Cl.
CPC ...... *G06F 11/1451* (2013.01); *G06F 11/1464* (2013.01); *G06F 11/1469* (2013.01); *G06F 16/172* (2019.01); *G06F 16/1774* (2019.01); *G06F 16/182* (2019.01); *G06F 16/185* (2019.01); *G06F 16/215* (2019.01); *H04L 67/1095* (2013.01); *H04L 67/1097* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,615,534 | B2* | 12/2013 | Cannon | G06F 16/119 707/825 |
| 9,342,529 | B2* | 5/2016 | Lin | G06F 16/183 |
| 2005/0065986 | A1* | 3/2005 | Bixby | G06F 16/128 |
| 2007/0260830 | A1* | 11/2007 | Faibish | G06F 3/061 711/162 |
| 2012/0254116 | A1* | 10/2012 | Thereska | H04L 63/205 707/640 |

* cited by examiner

*Primary Examiner* — Belix M Ortiz Ditren
(74) *Attorney, Agent, or Firm* — Workman Nydegger

(57) ABSTRACT

Systems and methods for migrating a metadata server are provided. A source metadata server is transferred to a new metadata server. During the migration process, only one of the metadata servers is active. Over time, data is transferred to the new metadata server until the new metadata server is fully synchronized with the source metadata server. Then metadata service process is terminated on the source metadata server and started on the new metadata server. The new metadata server transitions to read/write and normal file system operations are resumed at the new metadata server.

18 Claims, 3 Drawing Sheets

US 10,713,121 B1

DYNAMIC MIGRATION OF A CLOUD BASED DISTRIBUTED FILE SYSTEM METADATA SERVER

FIELD OF THE INVENTION

Embodiments of the present invention relate to migrating file systems and more particularly to migrating metadata servers associated with cloud based distributed file systems.

BACKGROUND

Generally, a file system is the manner in which data is organized and accessed in computing system. A file system may also refer to the structures used to keep track of the data. Some file systems, by way of example, use a folder or directory structure to store data. Initially, file systems were specific to a single computer. Over time as technology advanced, the need for file systems that could accommodate network configurations arose. Today, there is a need for file systems that store data in the cloud (e.g., on storage devices accessed over the Internet).

A distributed file system for the cloud is configured to keep data stored in the cloud organized. The file system may provide access to many clients and may support multiple file system operations such as create, delete, read, write, etc.

In order for a distributed cloud based file system to operate successfully, it is necessary to store metadata. The metadata is quite important because the metadata allows the files to be located, retrieved, deleted, stored, written, and the like. Systems and methods are needed for managing the metadata.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
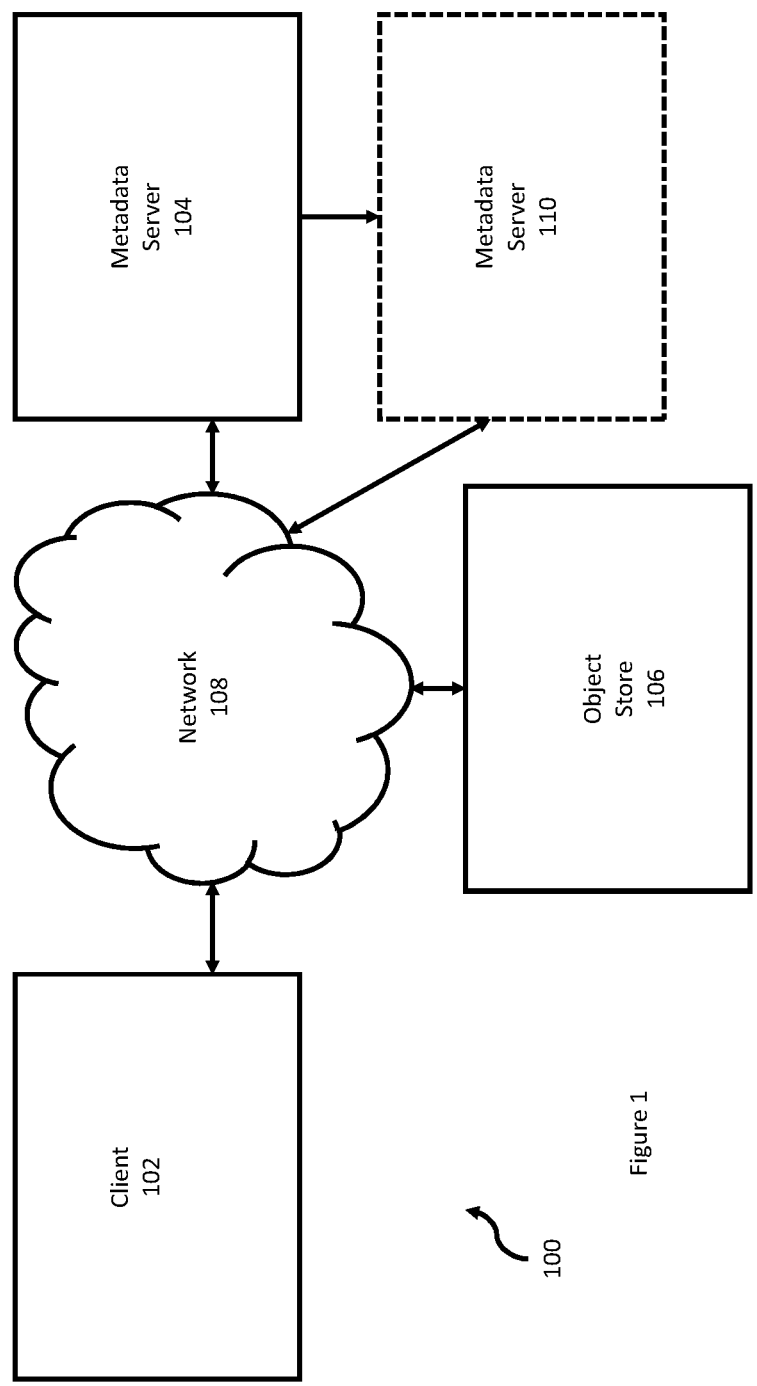
FIG. 1 illustrates an example of a distributed file system in a cloud or networked environment and illustrates the migration of a metadata server.

Embodiments of the invention relate to distributed file systems including cloud based distributed file systems. Embodiments of the invention further relate to systems and methods for managing metadata in distributed file systems and to systems and methods for migrating metadata or a metadata server in a cloud based distributed file system.

Embodiments of the invention dynamically migrate a metadata server of a distributed file system (or other server or data) to another server or computer. This may be done, for example, to move the metadata server to computers that have more resources. A metadata server may be migrated between different types of nodes, such as, but not limited to, virtual machines, physical servers, and different computer providers or environments. Embodiments of the invention further migrate or move a metadata server on a live file system without disrupting user operations.

The metadata server of a distributed file system is very important. Every client initiated file system operation such as create, read, write, etc., requires access to the metadata server. The metadata server enables the data or file that is the subject of the operation to be located, accessed, reconstituted, written, copied, deleted, and the like.

By way of example only, the metadata server may be provisioned on a single computer (virtual machine or physical server) or in a server cluster arrangement. There are several reasons why the metadata server might have to be moved to a new computer. By way of example only, the metadata server might have to be powered off for maintenance, the metadata server might have limited resources that might be insufficient for the optimal performance of the metadata server, a different host or provider may offer better service or pricing, or the user may want to relocate to a new datacenter.

When migrating a metadata server, embodiments of the invention, for example, account for the on disk state which needs to be moved with the metadata server onto the destination computer. The memory (e.g., flash memory, RAM, caches) may be in a state that needs to be flushed to disk. Transactions and other information stored in the memory are thus considered during the migration process and migrated. In addition, clients are made aware of the existence of the new metadata server so that the clients can connect and restart file system operations on the new metadata server without user intervention.

By way of example and not limitation, embodiments of the invention will be described with reference to a data storage system that is configured to store files. Embodiments of the invention can be applicable to other systems capable of storing data in various forms and configurations. Although reference may be made to files or chunks, these terms are not limiting and embodiments of the invention may be applicable to any data or object.

As previously stated, distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as a private object store, a public object store and/or a hybrid object store. Access to the data on these object stores may be managed by a metadata server, which could be a local or remote server from the client.

While cloud based object stores may create the appearance of a single object store, the data may actually be physically stored across multiple datacenters that are geographically diverse. For example, portions of data may be stored at geographically distinct datacenters may still be part of the same logical object store.

FIG. 1 illustrates an example of a system 100 implementing a distributed file system in a cloud or network environment. FIG. 1, as further described below, illustrates the importance of a metadata server in a distributed file system. The system of FIG. 1 may include a client 102, metadata server (MDS) 102, and an object store 106. While only one client 102 is shown in FIG. 1, the distributed file system may be used by or associated with multiple clients. Similarly, the distributed file system may include multiple object stores 106 and/or multiple MDS 104.

The client 102 may be any computing device. For example, client 102 may be a personal computer, workstation, handheld computer, smart phone, server computer, virtual machine, and/or tablet computer. Additionally or alternatively, the client 102 may be a software module or application running on a general purpose computing device. The client 102 may be in communication with the MDS 104 and the object store 106 over a network connection 108 (e.g., a local area network, wide area network, the Internet, or the like or combination thereof or any other network, including wireless and/or wired networks).

The client 102 may interact with the distributed file system shown in FIG. 1 as it would with a traditional file system, such as by writing data to and reading data from the distributed file system.

The MDS 104 may be a computing device that manages the distributed file system metadata. This metadata could include, by way of example and not limitation, the location of data stored in the distributed file system. The MDS 104 may also include metadata related to deduplicating the data stored in the object store 106. The MDS 104 may be a physical or a virtual machine, and may operate in an environment local to or remote from the client 102. For example, the MDS 104 may be a virtual machine operating in the same datacenter as the client 102. Additionally or alternatively, the MDS 104 may operate in a third party cloud environment. In some embodiments, the MDS 104 may operate in the same third party cloud environment as the object store 106. Generally, the MDS 104 is accessed over the network 108 and may communicate with the client 102 using appropriate protocols.

The object store 106 may include a storage device or storage devices for storing data in the distributed file system. The object store 106 may be a private, public, or hybrid cloud environment capable of storing data. A private cloud may be an object store only available to clients belonging to a particular enterprise. A public cloud may be any object store accessible to the public that requires authentication to access certain data. A hybrid cloud may be a combination of a private and public cloud, such that some data is stored in the private cloud and other data is stored in the public cloud.

In some embodiments, the client 102 may transmit communications to and receive responses from the MDS 104. Similarly, the client 102 may transmit communications to and receive responses from object store 106. Typically these communications will be IO requests and responses, such as read/write communications, though any other type of communication is consistent with the present disclosure.

For example, the client 102 may decide to read data from the distributed file system. The client 102 may first mount the distributed file system by transmitting a mount request and/or intent to MDS 104. If the distributed file system has already been mounted, the client 102 may transmit a change location or a directory request to the MDS 104. In response, the MDS 104 may consult a metadata table to determine data objects located at the root of the mount or in the new location, and transmit information related to the data back to the client 102. This data could be, for example, a list of files and/or directories located at the root or new location. The data may also include a unique identifier for each data object, such as a hash and/or path of the data object.

Once the client 102 has a list of files and/or directories, the client 102 may select a data object to read. The client 102 may transmit a read request identifying the desired data object back to the MDS 104. In some embodiments, this read request may include a path or hash identifier for the data object the client desires. Once the MDS 104 receives the request, the MDS 104 may attempt to locate the data object on the distributed file system.

In an embodiment, the MDS 104 maintains location data for all of the data objects in the distributed file system and that may be stored in the object store 106. This location data may be maintained with other data object metadata in a database on the MDS 104. For example, the database may comprise a table mapping a data object to one or more object store locations. These object store locations could reside, for example, on the object store 106.

In response to the read request received from the client 102, the MDS 104 may consult the database table to determine the object location. The MDS 104 may then return the object location back to client 102. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system and/or a container on the object store used by the distributed file system, and <object identifier> identifies the object to be read. In an embodiment, the object identifier is a hash of the object and/or a hash of a version of the object.

The client 102 may attempt to access the data object once it receives the data object location from the MDS 104. If the data object location is a URL, the client may issue an HTTP GET to the URL. For example, the client may issue a GET to the object store 106 and/or the cloud service provider holding the data object. In response, the object store 106 may return the requested data object to the client 102.

Embodiments of the present system may also be used to write data objects to the distributed file system. This process may be similar to reading data objects, as discussed above. Once the distributed file system is mounted and client 102 has identified the file system location where it wishes to write the data, the client 102 may transmit a write request to the MDS 104. This write request may include the identified file system location and an object identifier for the data object client 102 intends to write. In some embodiments, this object identifier may be a hash of the data object or a hash of a version of the data object. The hash may also be generated by the MDS 104.

Upon receiving the write request, the MDS 104 may consult a database table to determine if the data object has already been placed in the object store 106 (thus performing deduplication). If the data object already exists, there is no need to write it to the object store a second time. The MDS 104 may perform this check by comparing the provided object identifier to all of the object identifiers in the table. If there is a match, the data object exists. If there is not a match, the data object does not exist.

If the data object already exists in the object store 106, the client 102 may not need to transmit the data object to the store a second time. Instead, the MDS 104 may create a new entry in the table comprising the object identifier and the location the client 102 wishes to write the data. The MDS 104 may then transmit a write complete notification to client 102, and the write process may terminate. Should the client 102 issue a subsequent read for the object, the MDS 104 may provide a URL to the data object on the object store 106 as discussed above. This process provides an inherent form of data deduplication by ensuring a data object is not written to the same object store multiple times.

If the MDS 104 determines that the object store 106 does not have a copy of the data object (i.e. the object identifier is not found in the table), it may create a new entry for the object as discussed above. The MDS 104 may additionally provide an object location back to the client 102, and associate this object location with the new table entry. In some embodiments the object location is a URL constructed in the same manner as the URL generated during the read process.

Once the client 102 receives the object location it may write the data object to that location. If the object location is a URL identifying an object store, such as the object store 106, the client 102 may write the data to that location using an HTTP POST and/or PUT. The POST and/or PUT request may include the data object that the client 102 wishes to store on the object store 106. In some embodiments, the client 102 may conclude that the write was successful after the post was sent and terminate the write process. Alternatively, the client 102 may wait for a confirmation from the object store 106 before determining the write was successful.

While the above examples discuss reading and writing data objects as individuals, other configurations may exist. For example, individual data objects may be broken into a set of chunks. Each of these chunks may be stored and accessed on the object store in the same manner as the individual data objects discussed above. When a client wishes to read a data object, the client may submit identifiers for all the data object's constituent chunks to the MDS 104 and receive a URL for each. Similarly, for writes the client 102 may submit identifiers for all the data object's constituent chunks to the MDS 104. In response, the MDS 104 may only provide write URLs for the chunks that do not already exist on the object store 106. If the chunks already exist, the MDS 104 may simply update the metadata table; there is no need to write the chunks a second time.

As previously described, it may become necessary or desirable to establish or create or move to a new MDS. FIG. 1 illustrates that the MDS 104 may be moved or migrated to a server 110. When the move or migration is complete, the server 110 becomes the MDS 110 for the distributed file system and the MDS 104 may be shut down and is no longer accessible to clients in the distributed file system.

Figure 2:
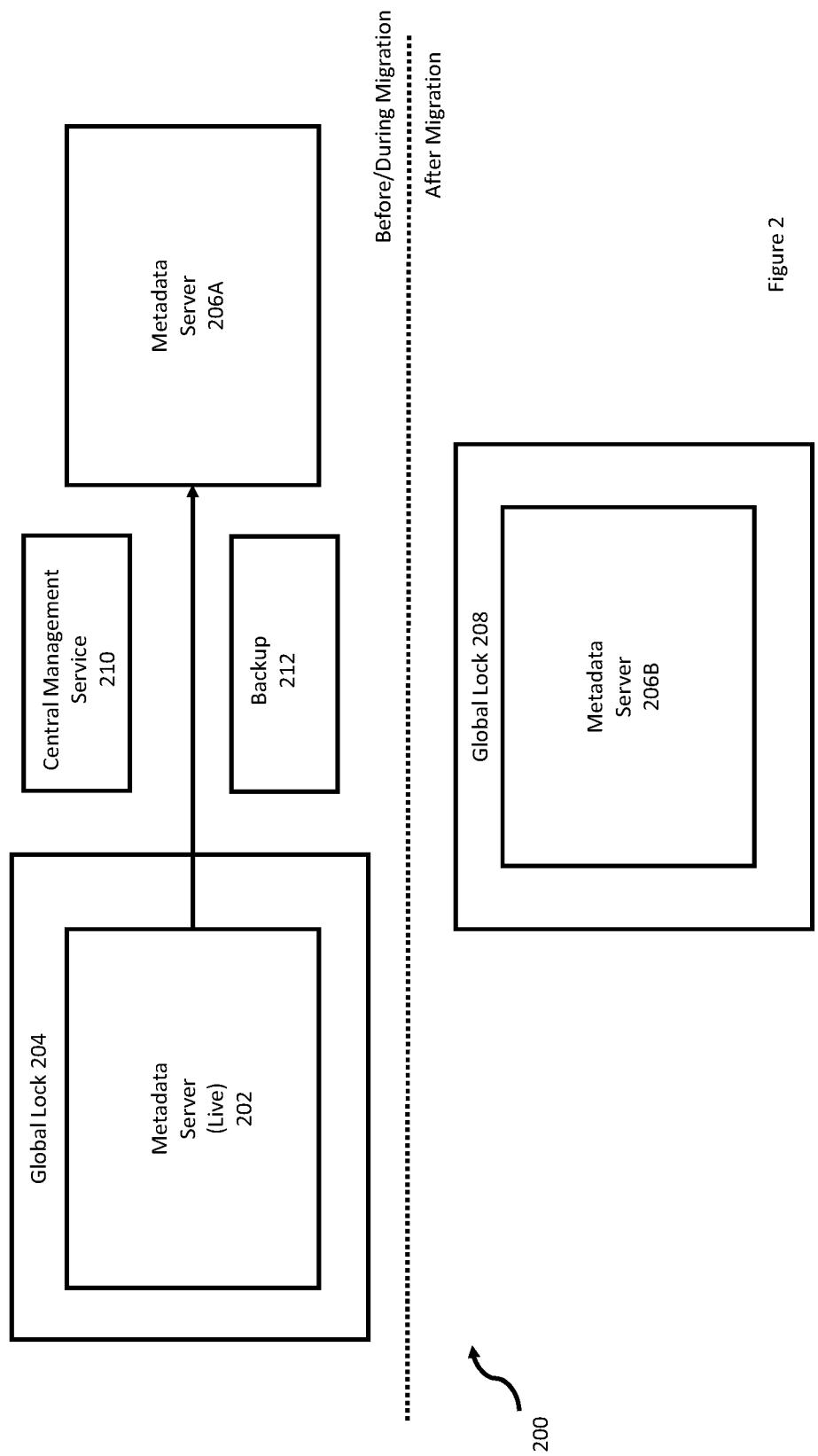
FIG. 2 illustrates the migration of a source metadata server to a destination metadata server.

FIG. 2 illustrates and example of migrating a metadata server. FIG. 2 illustrates an existing or source MDS as the MDS 202. The source MDS 202 is being migrated to a new MDS 206 (illustrated as MDS 206A (during the migration process) and MDS 206B (after the migration process)). FIG. 2 illustrates that the source MDS 202 is migrating to new computing resources to become MDS 206 (the new MDS). In FIG. 2, the MDS 202 continues to serve clients during the migration process. In other words, the MDS 202 is live and accessible during the migration process or during most of the migration process.

The MDS 202 is associated with a global lock 204. The global lock 204 ensures that only one metadata server is active at a time for the distributed file system. Further, metadata servers are only discoverable after they have acquired a global lock. Thus, the MDS 206A is not discoverable at least because the MDS 206A is not associated with a global lock. Thus, before and during the migration process, the MDS 202 is the live metadata server for clients. The metadata server 202 is thus used by clients during the migration process.

After the migration process, the global lock 204 is released. In one example, the global lock 204 (shown as global lock 208 and which may be a different lock) is acquired by the metadata server 206B. Once the global lock 204 is released, the MDS 202 is now old, is fully shut down, and is not associated with a lock and is no longer accessible by clients. After the migration process, the new MDS 206B is associated with the global lock 208 and the new MDS 206B begins servicing clients in the distributed file system.

FIG. 2 further illustrates that the MDS 206 may be migrated directly from the MDS 202 and that the migration process may be managed by a central management service 210. The central management service 210, which may reside on a different server, may control when each aspect of the migration process begins and ends. For example, the central management service 210 may perform or control the method of FIG. 3, discussed below.

Alternatively, instead of transferring the MDS 202 directly to the MDS 206 (e.g., using a snapshot), the bulk of the MDS 202 may be transferred to the MDS 206A from a backup 212 of the MDS 202. Once the restore is complete, the MDS 206A is further augmented with additional data from the MDS 202. These final data transfers are intended to synchronize the MDS 206A with the MDS 202. Once synchronized, the MDS 206A can go live as the MDS 206B and the MDS 202 may be shut down.

Further, the data transferred to the MDS 206A from the MDS 202 may not be directly transferred from the MDS 202. In one example, the source server (the MDS 202) may send data to an intermediary object store. The destination server (the MDS 206A) may then download the data from the intermediary object store.

Figure 3:
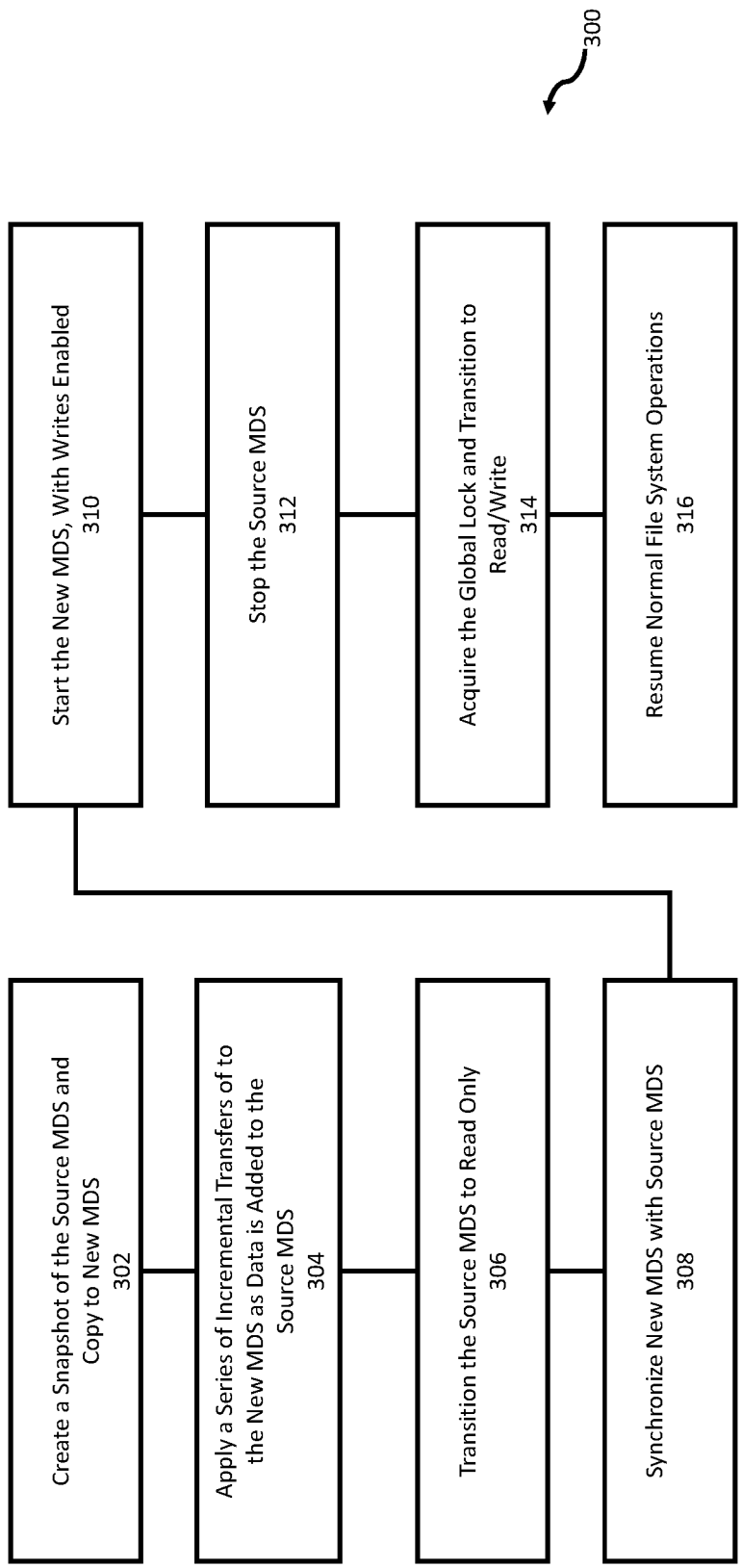
FIG. 3 illustrates an example of a method for migrating a metadata server from a source metadata server to a destination metadata server.

FIG. 3 illustrates an example of a method for migrating a metadata server. The migration is performed, in one embodiment, while the source metadata server continues to service clients using the distributed file system. In block 302, a snapshot of the source MDS is created and copied to the new MDS. In other words, a snapshot (e.g., a copy-on-write) of the source database is created and copied to the new MDS. Alternatively, the creation of the new MDS may begin by restoring a backup of the source MDS to the new MDS.

As new data is added to the source MDS (because it is still the live MDS), the new data is also transferred to the new MDS in block 304. For example, the new data may be recorded such that the changes to the metadata represented by the new data can be applied to the new MDS. This may be performed in a series of incremental transfers. Each transfer may be delivered to the nee MDS and the changes included in the transfer are applied to the metadata maintained by the new MDS. The changes may be applied in chronological order in one example. Over time, the new MDS will converge with the source MDS and the incremental transfers will become smaller.

In block 306, the source MDS transitions to read-only mode to prevent any of the metadata from changing. The metadata service may also flush all in-memory state to disk. The memory may be flushed just prior to transitioning to read-only mode or changes made to the metadata by flushing the memory may be allowed. Thus, the source MDS is read-only from the perspective of the clients. After the memory has been flushed to disk, a final transfer of metadata is performed so that the new MDS is fully synchronized with the source MDS in block 308.

Next, the metadata service process is started on the new MDS in block 310. At this time (e.g., when the new metadata service process is started), writes are enabled at the new MDS. The metadata service process at the source MDS is then stopped in block 312. This also releases the global lock associated with the source MDS.

The metadata service on the new MDS acquires the global lock and transitions to read/write mode in block 314. Thus, as the source MDS shuts down, the new MDS comes online and becomes the live MDS for the distributed file system.

In block 316, client detect that the connection with the source MDS has been lost. The new MDS is discovered and normal file system operations resume. For example, other servers in the file system may maintain information that allows the clients to discover the new MDS. The distributed file system may also include a command that may be used to identify the metadata server.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for migrating a metadata server associated with a distributed file system, the method comprising:
copying metadata maintained by a source metadata server to a new metadata server, wherein the source metadata server is configured to provide clients with locations of data associated with the metadata in response to requests from the clients, wherein the data is not stored with the metadata;
transitioning the source metadata server to read only after the metadata maintained by the new metadata server is synchronized with the metadata maintained by the source metadata server;
stopping the source metadata server such that the source metadata server no longer responds to the requests from the clients;
transitioning the new metadata server to read/write; and
resuming file system operations with the new metadata server, wherein the new metadata server responds to the requests from the clients.

2. The method of claim 1, wherein copying metadata maintained by a source metadata server to a new metadata server includes creating a snapshot of the metadata and copying the snapshot to the new metadata server.

3. The method of claim 1, wherein copying metadata maintained by a source metadata server to a new metadata server includes restoring a backup of the metadata server to the new metadata server.

4. The method of claim 1, further comprising adding new metadata to the metadata stored by the new metadata server before the source metadata server is stopped.

5. The method of claim 4, further comprising applying a series of incremental transfers to the new metadata server, wherein the series of incremental transfers each include at least some of the new metadata.

6. The method of claim 1, further comprising transitioning the source metadata server to read only.

7. The method of claim 1, further comprising transitioning the source metadata server to read only prior to stopping the source metadata server.

8. The method of claim 1, further comprising enabling writes on the new metadata server after the new metadata server is synchronized with the source metadata server.

9. The method of claim 1, wherein stopping the source metadata server includes releasing a global lock associated with the source metadata sever.

10. The method of claim 9, further comprising acquiring the global lock for the new metadata server such that the source metadata server is no longer available for clients.

11. The method of claim 1, further comprising discovering the new metadata server by the clients.

12. A method for migrating a metadata server associated with a distributed file system, the method comprising:
 copying metadata of a source metadata server to a new metadata server, wherein the source metadata server remains live in the distributed file system, wherein the source metadata server is configured to provide clients with locations of data associated with the metadata in response to requests from the clients, wherein the data is not stored with the metadata;
 as new metadata is added to the source metadata server, applying a series of incremental transfers to copy the new metadata to the new metadata server, wherein each incremental transfer includes at least a portion of the new metadata;
 flushing a memory of the source metadata server;
 synchronizing the new metadata server with the source metadata server by performing a final transfer;
 starting the new metadata server with writes enabled and stopping the source metadata server, wherein the new metadata server pervades the clients with the locations of the data stored in the distributed file system in response to the requests from the clients;
 acquiring a global lock for the new metadata server and resuming normal file operations with the new metadata server, wherein the source metadata server is no longer available to clients.

13. The method of claim 12, wherein copying metadata of a source metadata server to a new metadata server includes creating a snapshot of the metadata and copying the snapshot to the new metadata server.

14. The method of claim 12, wherein copying metadata of a source metadata server to a new metadata server includes restoring a backup of the sou-e metadata server to the new metadata server.

15. The method of claim 12, further comprising transitioning the source metadata server to read only after applying the series of incremental transfers.

16. The method of claim 15, further comprising transitioning the source metadata server to read only prior to stopping the source metadata server.

17. The method of claim 12, further comprising enabling writes on the new metadata server after the new metadata server is synchronized with the source metadata server.

18. The method of claim 12, further comprising releasing a global lock associated with the source metadata sever.

* * * * *